(12) United States Patent
Lee et al.

(10) Patent No.: US 8,429,959 B2
(45) Date of Patent: Apr. 30, 2013

(54) APPARATUS AND METHOD FOR TESTING BRAKING PERFORMANCE

(75) Inventors: Gum Gee Lee, Seoul (KR); Yong Soo Jang, Icheon-si (KR); Hyun Kyu Cho, Icheon-si (KR)

(73) Assignee: Gumyoung General Co., Ltd., Seoul (KR)

( * ) Notice: Subject to any disclaimer, the term of this patent is extended or adjusted under 35 U.S.C. 154(b) by 0 days.

(21) Appl. No.: 13/320,545

(22) PCT Filed: Jan. 19, 2010

(86) PCT No.: PCT/KR2010/000337
§ 371 (c)(1),
(2), (4) Date: Nov. 15, 2011

(87) PCT Pub. No.: WO2010/131830
PCT Pub. Date: Nov. 18, 2010

(65) Prior Publication Data
US 2012/0060597 A1   Mar. 15, 2012

(30) Foreign Application Priority Data
May 15, 2009   (KR) .................. 10-2009-0042822

(51) Int. Cl.
*G01L 5/28*   (2006.01)

(52) U.S. Cl.
USPC ............................................................ 73/121

(58) Field of Classification Search ............. 73/121
See application file for complete search history.

(56) References Cited

U.S. PATENT DOCUMENTS

| 7,377,371 B2* | 5/2008 | Reuter et al. | 188/188 |
| 2006/0157306 A1* | 7/2006 | Reuter et al. | 188/188 |
| 2010/0154527 A1* | 6/2010 | Illan | 73/121 |

* cited by examiner

*Primary Examiner* — Freddie Kirkland, III
(74) *Attorney, Agent, or Firm* — Li & Cai Intellectual Property (USA) Office

(57) ABSTRACT

Disclosed are an apparatus and method for testing braking performance. The apparatus of the disclosed invention comprises: a driving unit which generates power; a test unit driven by the driving unit; and a control unit which controls the operation of a braking apparatus to generate a brake force on the test unit and to check braking performance. The present invention uses a rope unit moving at a speed for inducing a braking operation by the rotation of driving sheaves spaced apart from each other, rather than testing braking performance in an expensive elevator test tower, thereby preventing the possible dangers of tests conducted in said test tower. Further, the present invention controls loading capacity simply by controlling the loads of the driving unit to enable easy testing.

16 Claims, 7 Drawing Sheets

APPARATUS AND METHOD FOR TESTING BRAKING PERFORMANCE

TECHNICAL FIELD

The present invention relates to an apparatus and method for testing braking performance, and more particularly, to an apparatus and method for testing braking performance of a brake apparatus.

BACKGROUND ART

Generally, an elevator car traveling through an elevator passage in a building is suspended from one end of a hoist rope, which is supported by a driving pulley and is connected at the other end thereof to a counterbalance typically having a heavier weight than the elevator car.

The elevator passage is provided with a vertical rail, on which rollers protruding from the elevator car are mounted to guide movement of the elevator car within the elevator passage, so that the elevator car is prevented from moving horizontally during movement of the elevator car in a vertical direction.

Fixed beams are placed under the driving pulley and a safety brake apparatus is mounted on the fixed beams to hold the hoist rope in order to prevent the elevator car from moving upon occurrence of an emergency, such as power-off of an elevator system, operation of the elevator car with a car door open, and the like.

Typically, for a performance test of such a safety brake apparatus, an elevator car is directly installed to a test tower and is allowed to free fall therefrom.

DISCLOSURE

Technical Problem

According to such a performance test in the related art, a test tower must be built to test performance of a brake apparatus, causing high investment cost.

In addition, such a conventional performance test can involve dangers such as falling of the elevator car and the like due to abnormal braking operation of the brake apparatus during the test.

Further, when the performance test is performed at limited speeds or more, the height of the test tower must be increased, thereby making it difficult to perform the test under various conditions and causing an increase in the number of operating personnel. Therefore, there is a need to solve such problems of the related art.

The present invention has been conceived to solve such problems of the related art and is directed to providing an apparatus and method for testing braking performance, which may significantly reduce investment costs for braking performance tests, guarantee test security, and facilitate testing of braking performance.

Technical Solution

An aspect of the present invention provides an apparatus for testing braking performance, which includes a drive unit generating power; a test unit driven by the drive unit; and a controller controlling operation of a brake apparatus to generate brake force on the test unit to test braking performance of the brake apparatus. Here, the test unit includes a sheave unit driven by the drive unit and a rope operated in connection with the sheave unit.

The sheave unit includes driving sheaves driven by the drive unit.

The drive unit may include a first drive unit and a second drive unit operated independently of each other, and the driving sheaves may be separated from each other and include a first driving sheave driven by the first drive unit and a second driving sheave driven by the second drive unit.

The sheave unit may further include a driven sheave receiving drive force of the driving sheaves via the rope.

The test unit may include a tension regulator controlling the sheave unit to regulate tension of the rope.

The tension regulator may control the driven sheaves to regulate tension of the rope.

The tension regulator may include a screw jack adjusting a height of the driven sheave.

The tension regulator may include a load cell measuring tension of the rope.

The controller may control drive force transferred from the drive unit to the sheave unit to regulate a specified load imparted to the rope.

The controller may measure at least one of torque or speed of the drive unit and braking time or braking distance of the rope braked by the brake apparatus to test braking performance of the brake apparatus.

Another aspect of the present invention provides an apparatus for testing braking performance, which includes a sheave unit including a first driving sheave, a second driving sheave and a driven sheave separated from one another; a rope wound around the sheave unit to rotate thereon and to be braked by a brake apparatus; a drive unit including a first drive unit driving the first driving sheave and a second drive unit driving the second driving sheave; and a controller controlling operation of the brake apparatus to brake the rope, controlling operation of the first and second driving sheaves to regulate tension imparted to the rope, and measuring at least one of torque or speed of the drive unit and braking time or braking distance of the rope braked by the brake apparatus to test braking performance of the brake apparatus.

A further aspect of the present invention provides a method for testing braking performance, which includes: (a) mounting a brake apparatus to be tested; (b) setting a specified load by setting at least one of torque and speed of a drive unit; (c) driving the drive unit to rotate the rope mounted on driving sheaves; (d) controlling operation of the brake apparatus to apply brake force to the rotating rope; and (e) measuring at least one of a braking time and a braking distance of the rope braked by the brake apparatus to test braking performance of the brake apparatus.

The driving the drive unit may include driving a first driving sheave and a second driving sheave separated from each other to rotate the rope.

The first driving sheave and the second driving sheave may be rotated in the same direction in an overspeed elevation test of the brake apparatus.

In a test for operation of the brake apparatus with a door open, after applying torque to the drive unit to force the first and second driving sheaves to rotate in opposite directions until the torque reaches a preset torque, the torque applied to one of the first and second driving sheaves may be blocked while allowing the other driving sheave to rotate.

The controlling operation of the brake apparatus may include: determining whether the driving sheaves reach a preset torque and speed; and applying a brake signal to the brake apparatus to brake the rope when the driving sheaves reach the preset torque and speed.

Advantageous Effects

According to exemplary embodiments, the apparatus and method for testing braking performance uses a rope, which is moved at a speed of inducing braking operation by rotation of driving sheaves separated from each other, instead of testing on an elevator test tower involving high investment cost, thereby reducing investment cost while preventing possible danger related to the performance testing on the elevator test tower.

Further, the test tower requires regulation of a counterweight and a balance weight of a car side for regulation of loading capacity, whereas the apparatus and method according to the embodiments may achieve regulation of loading capacity through regulation of load of the drive unit and may allow speed control and measurement of the drive unit for regulation of rated speed, thereby facilitating the test Further, the test tower requires an average of 5 or more operators for CP manipulation, main brake manipulation, car side data measurement, load regulation, and the like for the performance test, whereas the apparatus and method according to the exemplary embodiments allow a significant reduction in the number of operators.

BEST MODE

Exemplary embodiments of the invention will now be described in more detail with reference to the accompanying drawings. It should be noted that the drawings are not to precise scale and may be exaggerated in thickness of lines or size of components for descriptive convenience and clarity only. Further, terms used herein are defined by taking functions of the present invention into account and can be changed according to the custom or intention of users or operators. Therefore, definition of the terms should be made according to the overall disclosure set forth herein.

Figure 1:
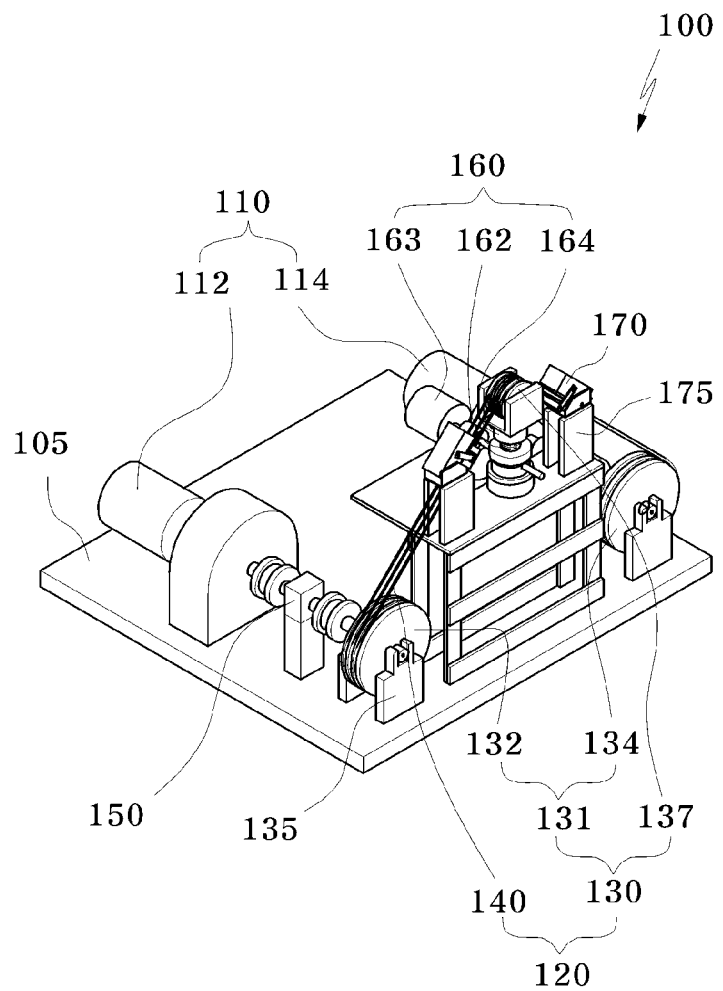
FIG. 1 is a perspective view of an apparatus for testing braking performance according to one exemplary embodiment of the present invention.
Figure 2:
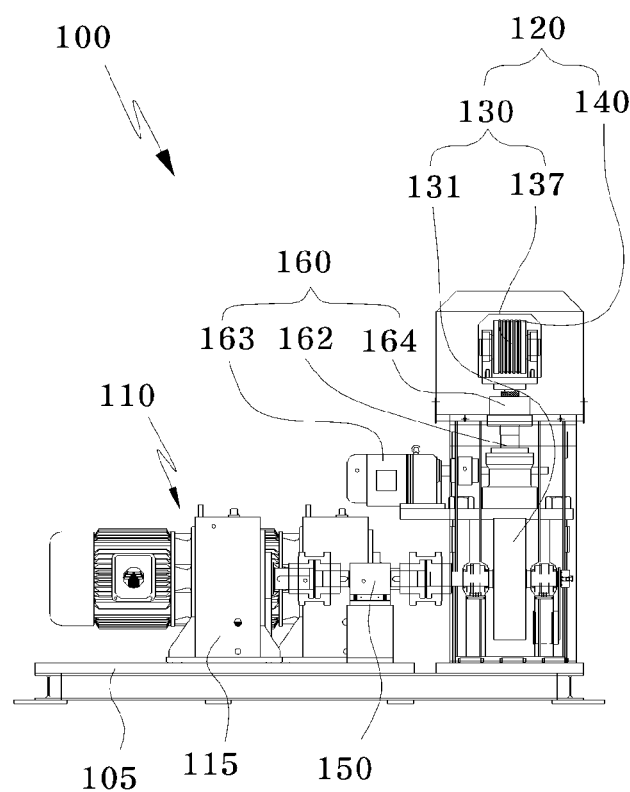
FIG. 2 is a side view of the apparatus according to the exemplary embodiment of the present invention.
Figure 3:
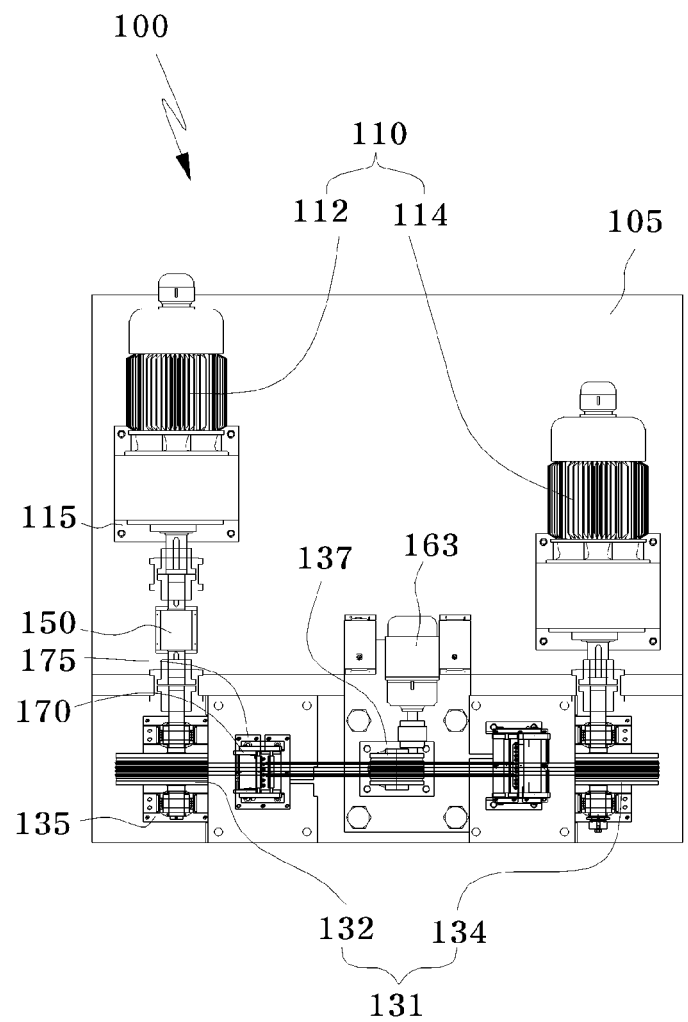
FIG. 3 is a plan view of the apparatus according to the exemplary embodiment of the present invention.
Figure 4:
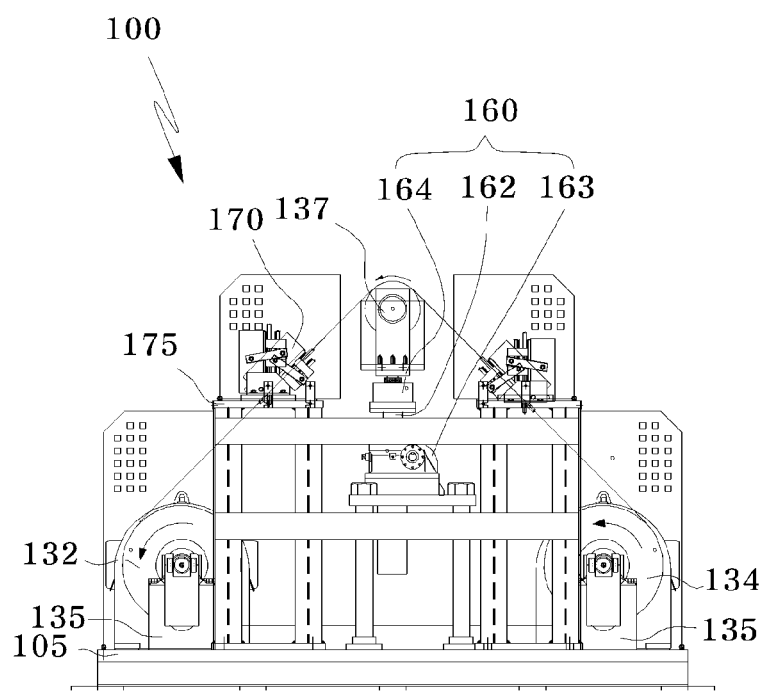
FIG. 4 is a front view of the apparatus according to the exemplary embodiment of the present invention, showing a driving direction in an overspeed elevation test.
Figure 5:
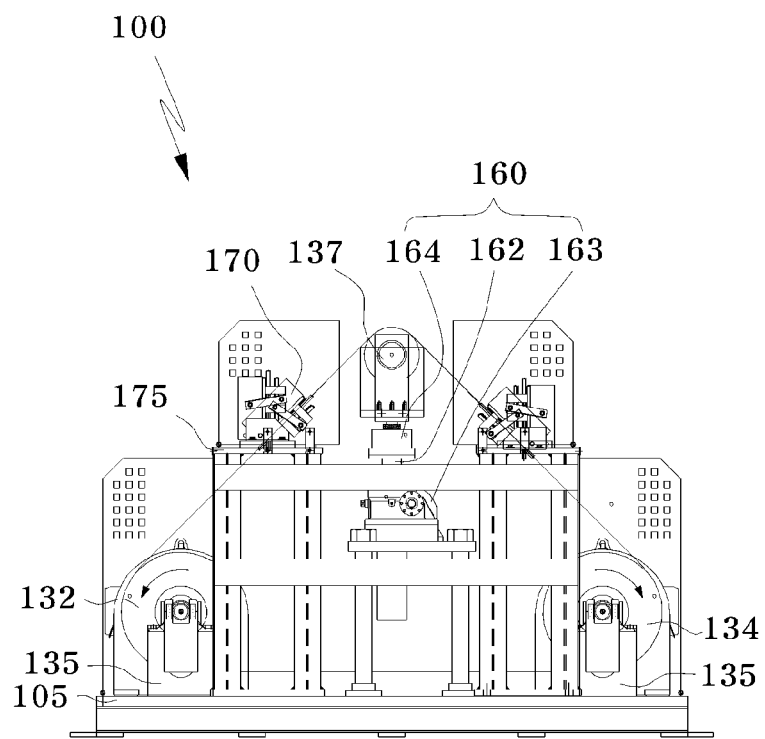
FIG. 5 is a front view of the apparatus according to the exemplary embodiment of the present invention, showing a driving direction in a test for operation with a door open.

FIG. 1 is a perspective view of an apparatus for testing braking performance according to one exemplary embodiment; FIG. 2 is a side view of the testing apparatus according to the exemplary embodiment; FIG. 3 is a plan view of the testing apparatus according to the exemplary embodiment; FIG. 4 is a front view of the testing apparatus according to the exemplary embodiment, showing a driving direction in an overspeed elevation test; and FIG. 5 is a front view of the testing apparatus according to the exemplary embodiment, showing a driving direction in a test for operation with a door open.

As shown in the drawings, the apparatus 100 for testing braking performance according to the exemplary embodiment of the invention includes a drive unit 110 generating power, a test unit 120 driven by the drive unit 110, and a controller 180 controlling operation of a brake apparatus 170 to generate drive force on the test unit 120 in order to confirm braking performance.

The drive unit 110 includes a vector inverter, a motor, and a decelerator. The drive unit 110 is secured to an upper side of a base 105 by a support bracket 115. The drive unit 110 includes a first drive unit 112 and a second drive unit 114 located parallel to each other. That is, the first and second drive units 112 and 114 are separated from each other and are operated independently of each other.

The test unit 120 includes a sheave unit 130 driven by the drive unit 110 and a rope 140 operated in connection with the sheave unit 130.

The sheave unit 130 includes driving sheaves 131 driven by the drive unit 110. The driving sheaves 131 include a first driving sheave 132 and a second driving sheave 134, which are separated from each other on the base 105 as in the drive unit 110. The first driving sheave 132 is connected to the first drive unit 112 via a shaft so as to be driven by the first drive unit 112, and the second driving sheave 134 is connected to the second drive unit 114 via a shaft so as to be driven by the second drive unit 112. The first and second driving sheaves 132, 134 are secured to the upper side of the base 105 by fixing brackets 135.

The sheave unit 130 may further include a driven sheave 137 receiving drive force of the driving sheaves 131 via the rope 140. The driven sheave 137 is placed above the middle between the first and second driving sheaves 132, 134 and is connected to the first and second driving sheaves 132, 134 via the rope 140 to receive drive force of the driving sheaves 131. The rope 140 is bent to a triangular shape by the driven sheave 137. As the drive unit 110 is operated, each of the sheaves 131 and 137 rotates, and the rope 140 connected to the sheaves 131 and 137 moves along a restricted region. Further, each of the sheaves 131 and 137 may be formed with a groove on which the rope 140 can be seated.

Here, at least one of the shaft connecting the first drive unit 112 and the first driving sheave 132 and the shaft connecting the second drive unit 114 and the second driving sheave 134 is provided with a sensor 150 which measures and sends speed and torque of the drive unit 110 to the controller 180. Further, the sensor 150 measures and sends revolutions per minute of the driving sheaves 131 to the controller 180.

The test unit 120 further includes a tension regulator 160, which controls operation of the sheave unit 130 to regulate tension of the rope 140. To regulate the tension of the rope 140 by controlling the driven sheave 137, the tension regulator 160 includes a screw jack 162, which is placed beneath the driven sheave 137 to adjust the height of the driven sheave 137. The tension regulator 160 adjusts the height of the driven sheath 137 through the screw jack 162, and includes a load cell 164, which measures tension applied to the rope 140 by height adjustment. Thus, the tension regulator 160 allows the driven sheave 137 to be adjusted in height by the screw jack 162 while being supported thereby and the tension applied to the rope 140 according to variation in height of the driven sheave 137 is measured by the load cell 164. Specifically, the screw jack 162 is connected to an elevation motor 163 to be moved up or down by drive force of the elevation motor 163, and the load cell 162 is disposed between the driven sheave 137 and the screw jack 162 to measure the tension of the rope wound around the sheave unit 130. This structure prevents the rope 140 from being slid from each of the sheaves 131, 137 by applying predetermined tension to the rope 140, thereby enabling more accurate testing.

The brake apparatus 170 is secured to a securing platform 175 formed on the upper side of the base 105. The securing platform 175 is placed on at least one side from the center of driven sheave 137, and the brake apparatus 170 secured to the securing platform 175 is connected to the controller 180. The brake apparatus 170 may be a rope gripper for elevator systems.

The controller 180 measures at least one of torque or speed of the drive unit 110 and braking time or braking distance of the rope 140 braked by the brake apparatus 170 to test the braking performance of the brake apparatus 170.

The torque or speed of the drive unit 110 is measured by the sensor 150, and the braking time or braking distance of the rope 140 is measured by a timer of the controller, based on revolutions per minute of the driving sheaves 131 measured by the sensor 150, after braking operation of the brake apparatus 170.

Figure 6:
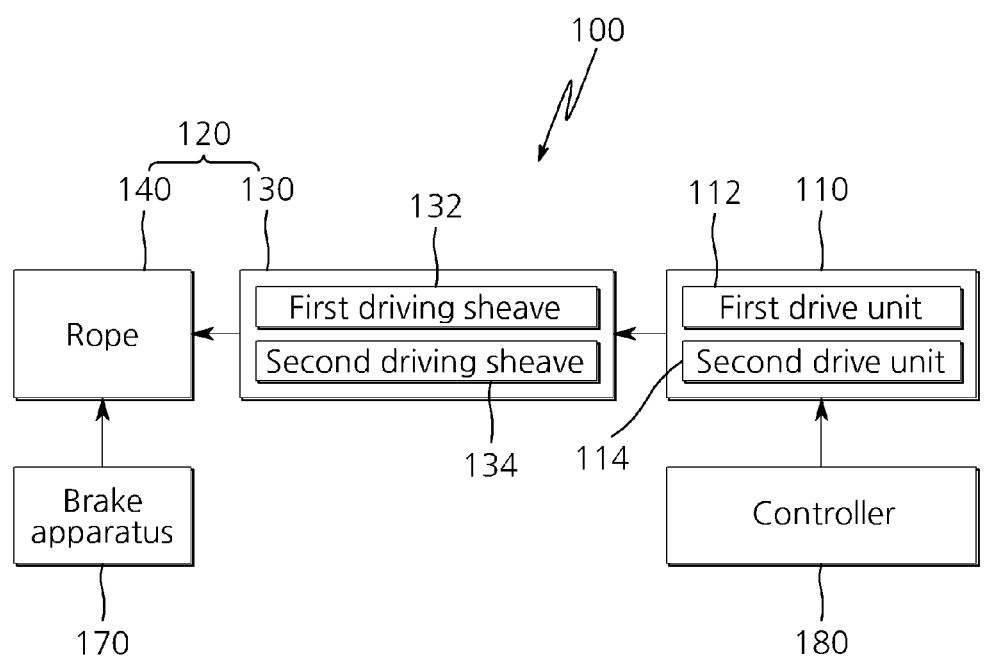
FIG. 6 is a block diagram of a method for testing braking performance according to one exemplary embodiment of the present invention.
Figure 7:
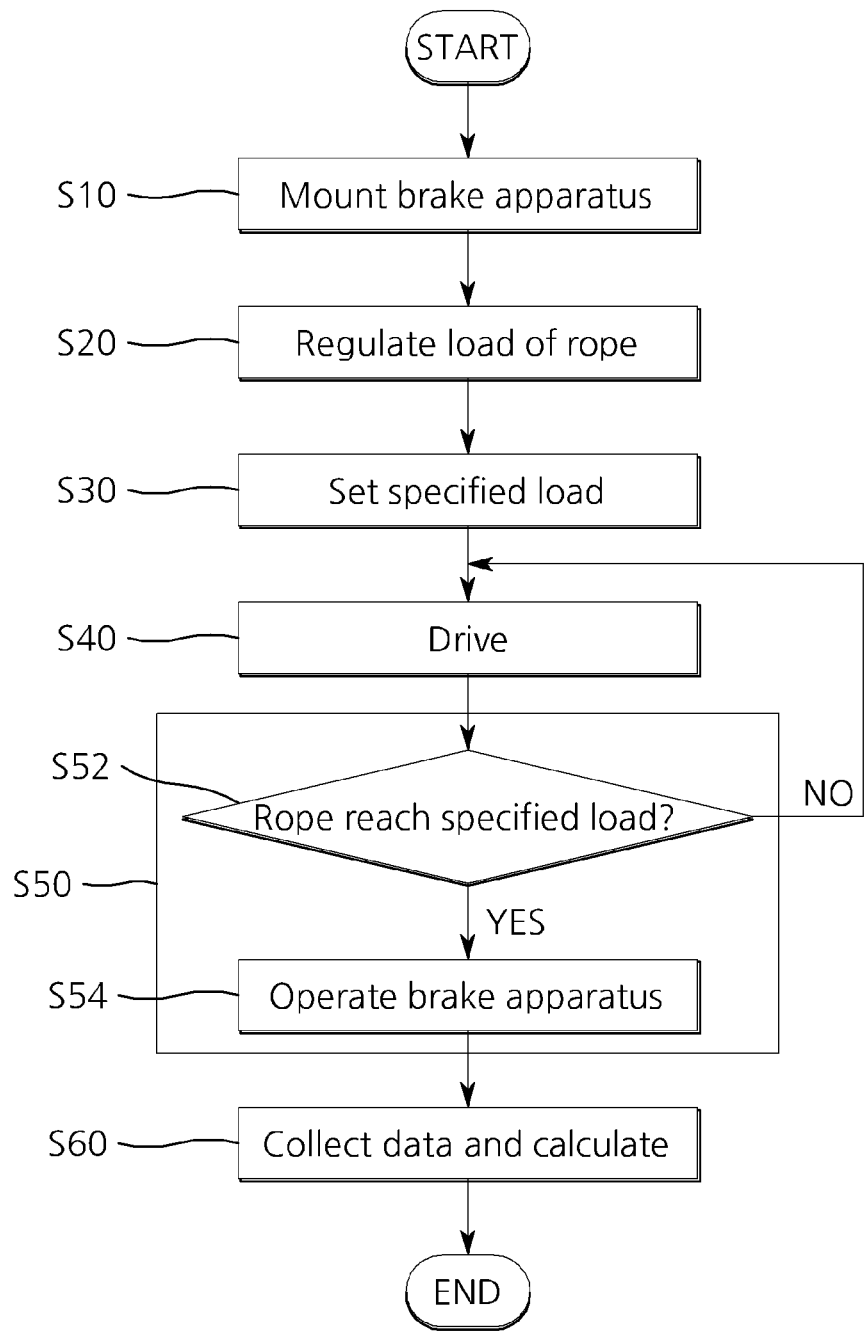
FIG. 7 is a flowchart of the method for testing braking performance according to the exemplary embodiment of the present invention.

FIG. 6 is a block diagram of a method for testing braking performance according to one exemplary embodiment, and FIG. 7 is a flowchart of the method for testing braking performance according to the exemplary embodiment.

As shown in the drawings, the method for testing braking performance according to the exemplary embodiment includes: mounting a brake apparatus 170 to be tested (S10); (b) setting a specified load by setting at least one of torque and speed of a drive unit 110 (S30); (c) driving the drive unit 110 to rotate the rope 140 mounted on driving sheaves 131 (S40), (d) controlling operation of the brake apparatus 170 to apply brake force to the rotating rope 140 (S50); and (e) measuring at least one of a braking time and a braking distance of the rope 140 braked by the brake apparatus 170 to test braking performance of the brake apparatus 170 (S60).

In operation S10, the brake apparatus 170 to be tested is lifted and secured to the securing platform 175. After mounting the brake apparatus 170 on the securing platform 175, a specified load is set by setting torque and speeds of first and second drive units 112, 114 by the controller 180 in S30.

It should be understood that the present invention is not restricted to the sequence of performing the operation S10 of mounting the brake apparatus 170 and the operation S30 of setting a specified load. Thus, the method according to this invention may be carried out in different ways, for example, by mounting the brake apparatus on the platform after setting a specified load.

Before setting a specified load in S30, the method further includes regulating tension of the rope 140 by elevating or lowering a driven sheave 137 through a tension regulator 160 in S20. That is, in this operation, a screw jack 162 is lifted or lowered to adjust the height of the driven sheave 137 by operating an elevation motor 163, and it may be confirmed through a load cell 162 disposed beneath the driven sheave 137 whether the load applied to the rope reaches a preset load according to variation of the height.

When the rope 140 is maintained at the preset load, it is possible to perform more accurate testing by preventing the rope from sliding from each of the sheaves 131, 137 during operation of the drive unit 110. In one embodiment, the rope 140 includes at least one of an endless wire, a belt, and a chain fastened to a sprocket.

The operation S20 of regulating tension of the rope 140 by elevating or lowering the driven sheave 137 may be performed in various ways, for example, before mounting the brake apparatus 170 or during operation of the brake apparatus 170.

After a specified load is set, the controller 180 sends a signal to operate the first and second drive units 112, 114 to rotate first and second driving sheaves 132, 134 in S40. As the first and second drive units 112, 114 are driven, the rope 140 connected to the first and second driving sheaves 132, 134 and the driven sheave 137 move along an area restricted by each of the sheaves 131, 137.

After operation S40, the brake apparatus 170 is controlled to apply brake force to the rope 140 in S50.

Operation S50 includes determining whether the driving sheaves 131 reach the preset torque and the preset speed (S52); and applying a brake signal to the brake apparatus 170 to brake the rope 140 when the driving sheaves 131 reach the preset torque and the preset speed (S54).

In operation S50, whether the driving sheaves 131 reach the preset torque and the preset speed may be determined by a sensor 150, which is placed on at least one of the drive unit 110 and the driving sheaves 131, that is, on at least one of a shaft connecting the first drive unit 112 and the first driving sheave 132 and a shaft connecting the second drive unit 114 and the second driving sheave 134.

When the sensor 150 sends a signal to the controller 180 indicating that driving sheaves 131 reach the preset torque and the preset speed, the controller 180 sends a brake signal to the brake apparatus 170 to brake the rope 140.

Then, operation S60 is performed. That is, the controller 180 calculates the speeds and torques of the driving sheaves 131, and measures a braking time of the rope 140 after braking operation of the brake apparatus 170, and a braking distance of the rope 140 based on revolutions per minute of the driving sheaves 131 measured by the sensor 150 after braking operation of the brake apparatus 170, thereby confirming braking performance of the brake apparatus 170.

In operation S40, the performance testing may be carried out in two manners according to driving directions of the first and second drive units 112, 114.

In the method according to this embodiment, it is possible to carry out a test for overspeed elevation of an elevator car caused by failure of an elevator control system or a winch brake system, and a test for operation of an elevator car with a door open, in which the elevator car is uncontrollably operated, with the door incompletely closed.

First, as shown in FIG. 4, the overspeed elevation test of the brake apparatus 170 may be carried out by operating the brake apparatus 170 when the first and second drive units 112, 114 reach specified speeds after rotating the first and second drive units 112, 114 in the same direction.

Further, as shown in FIG. 5, the test for operation of the brake apparatus 170 with a door open may be carried out by operating the brake apparatus 170 simultaneously with stopping one of the first and second drive units 112 and 114 after rotating the first and second drive units 112, 114 in opposite directions.

Accordingly, the method according to this embodiment of the invention may confirm braking performance of the brake apparatus 170, thereby enabling the provision of a stable brake apparatus 170 capable of guaranteeing security of passengers using a corresponding elevator system.

Although some embodiments have been described herein, it should be understood by those skilled in the art that these embodiments are given by way of illustration only, and that various modifications, variations, and alterations can be made without departing from the spirit and scope of the invention.

Therefore, the scope of the invention should be limited only by the accompanying claims and equivalents thereof.

What is claimed is:

1. An apparatus for testing braking performance comprising:
   a drive unit generating power;
   a test unit driven by the drive unit, the test unit comprising a sheave unit driven by the drive unit and a rope operated in connection with the sheave unit; and
   a controller controlling operation of a brake apparatus to generate brake force on the test unit to test braking performance of the brake apparatus.

2. The apparatus of claim 1, wherein the sheave unit comprises driving sheaves driven by the drive unit.

3. The apparatus of claim 2, wherein the drive unit comprises a first drive unit and a second drive unit operated independently of each other, and the driving sheaves are separated from each other and comprises a first driving sheave driven by the first drive unit and a second driving sheave driven by the second drive unit.

4. The apparatus of claim 2, wherein the sheave unit further comprises a driven sheave receiving drive force of the driving sheaves via the rope.

5. The apparatus of claim 4, wherein the test unit comprises a tension regulator controlling the sheave unit to regulate tension of the rope.

6. The apparatus of claim 5, wherein the tension regulator controls the driven sheave to regulate tension of the rope.

7. The apparatus of claim 6, wherein the tension regulator comprises a screw jack adjusting a height of the driven sheave.

8. The apparatus of claim 5, wherein the tension regulator comprises a load cell measuring tension of the rope.

9. The apparatus of claim 1, wherein the controller controls drive force transferred from the drive unit to the sheave unit to regulate a specified load imparted to the rope.

10. The apparatus of claim 1, wherein the controller measures at least one of torque or speed of the drive unit and braking time or braking distance of the rope braked by the brake apparatus to test braking performance of the brake apparatus.

11. An apparatus for testing braking performance comprising:
    a sheave unit comprising a first driving sheave, a second driving sheave and a driven sheave separated from one another;
    a rope wound around the sheave unit to rotate thereon and to be braked by a brake apparatus;
    a drive unit comprising a first drive unit driving the first driving sheave and a second drive unit driving the second driving sheave; and
    a controller controlling operation of the brake apparatus to brake the rope, controlling operation of the first and second driving sheaves to regulate tension imparted to the rope, and measuring at least one of torque or speed of the drive unit and braking time or braking distance of the rope braked by the brake apparatus to test braking performance of the brake apparatus.

12. A method for testing braking performance, comprising:
    (a) mounting a brake apparatus to be tested;
    (b) setting a specified load by setting at least one of torque and speed of a drive unit;
    (c) driving the drive unit to rotate the rope mounted on driving sheaves;
    (d) controlling operation of the brake apparatus to apply brake force to the rotating rope; and
    (e) measuring at least one of a braking time and a braking distance of the rope braked by the brake apparatus to test braking performance of the brake apparatus.

13. The method of claim 12, wherein the driving the drive unit comprises driving a first driving sheave and a second driving sheave separated from each other to rotate the rope.

14. The method of claim 13, wherein the first driving sheave and the second driving sheave are rotated in the same direction in an overspeed elevation test of the brake apparatus.

15. The method of claim 13, wherein the first driving sheave and the second driving sheave are rotated in opposite directions in a test for operation of the brake apparatus with a door open.

16. The method of claim 12, wherein the controlling operation of the brake apparatus comprises:
    determining whether the driving sheaves reach a preset torque and speed; and
    applying a brake signal to the brake apparatus to brake the rope when the driving sheaves reach the preset torque and speed.

* * * * *